US011637877B1

(12) United States Patent
Zhu et al.

(10) Patent No.: US 11,637,877 B1
(45) Date of Patent: Apr. 25, 2023

(54) INTERACTIVE VIDEOCONFERENCING SYSTEM

(71) Applicant: Quantcast Corporation, San Francisco, CA (US)

(72) Inventors: Sean Zhu, Mexico City (MX); Sahan Peiris, Berkeley, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

(21) Appl. No.: 17/467,701

(22) Filed: Sep. 7, 2021

Related U.S. Application Data

(60) Provisional application No. 63/075,662, filed on Sep. 8, 2020.

(51) Int. Cl.
*H04N 7/15* (2006.01)
*H04L 65/401* (2022.01)
*H04L 65/1093* (2022.01)

(52) U.S. Cl.
CPC ...... *H04L 65/4015* (2013.01); *H04L 65/1093* (2013.01); *H04N 7/15* (2013.01)

(58) Field of Classification Search
CPC ........... H04N 7/15; H04N 7/147; H04L 29/06
USPC ........................................... 348/14.01–14.16
See application file for complete search history.

(56) References Cited

U.S. PATENT DOCUMENTS

2011/0196928 A1* 8/2011 Pryhuber ................. H04N 7/15
  709/204
2015/0304607 A1* 10/2015 Bader-Natal ........... H04N 7/157
  348/14.08

FOREIGN PATENT DOCUMENTS

WO   WO-2019058283 A1 *   3/2019   ........... G06Q 50/205

* cited by examiner

*Primary Examiner* — Melur Ramakrishnaiah
(74) *Attorney, Agent, or Firm* — Andrea Wheeler

(57) ABSTRACT

A videoconferencing system receives audio and/or video signals ("AV"), information, and control signals from meeting participants. The videoconferencing system processes and routes the received AV and information, based on the received control signals, to provide AV and information to meeting participants. The videoconferencing system enables participants to to know details about breakout room (e.g., what breakout rooms are available, how many people are attending each breakout room, who is attending each breakout room, the topics of the breakout rooms), hear audio, see video, and receive information corresponding breakout rooms that they have not joined, join a breakout room, leave a breakout room, create breakout rooms, invite other participants to join a breakout room, and make a breakout room private.

18 Claims, 10 Drawing Sheets

INTERACTIVE VIDEOCONFERENCING SYSTEM

CROSS-REFERENCE TO RELATED APPLICATIONS

This application claims the benefit of priority to U.S. Provisional Application No. 63/075,662, entitled "Interactive Videoconference Breakout Rooms," filed Sep. 8, 2020, all of which is hereby incorporated by reference in its entirety.

BACKGROUND

Current videoconference systems often provide breakout rooms ("rooms") to participants in a meeting. A meeting host can set up the breakout rooms and assign meeting participants to their corresponding rooms. Meeting participants can then hold breakout videoconference sessions with their breakout room participants, including shared audio and video.

Current videoconferencing systems have several drawbacks. Meeting participants cannot choose which breakout room they participate in. Meeting participants cannot see which other participants are already in a breakout room, or see or hear what is happening in a breakout room. Once in a breakout room, breakout room participants cannot see or hear what is happening in other breakout rooms, or see who is in other breakout rooms. Once in a breakout room, breakout participants cannot choose to move to another breakout room.

In addition, current videoconference systems also do not provide desired capabilities to meeting participants. In one example, meeting participants would like to have a "social" virtual meeting experience. Like attending an in-person social event, participants in a virtual meeting would like to see who else is in the venue. If they see someone they want to talk to, they want to be able to join them and start a conversation. If they see a group of people they know, they want to be able to join the conversation. If they overhear an interesting conversation, they want to be able to join the conversation. If they are in a group or conversation that is uninteresting to them, they want to be able to leave and find a more interesting conversation to join.

In another example, meeting participants would like to have a "convention" virtual meeting experience. Like attending an in-person convention, participants in a virtual meeting would like to be able to see all of the workshops available, and then decide which they would like to join. Meeting participants would like to see if a workshop is full or empty before they choose to join. Meeting participants would like to see who is in a workshop before they join. Meeting participants would like to see what is being presented in a workshop. If they see something interesting, they want to be able to join the workshop. Meeting participants would like to choose to join and leave workshops on their own schedule and order.

What is needed is an interactive videoconference system that allows meeting participants to know details about each available breakout room (e.g., what breakout rooms are available, how many people are attending each breakout room, who is attending each breakout room, the topics of the breakout rooms), hear audio and see video of breakout rooms that they have not joined, join a breakout room, leave a breakout room, create breakout rooms, invite other participants to join a breakout room, and make a breakout room private.

SUMMARY

A videoconferencing system receives audio and/or video signals ("AV"), information ("info"), and control signals from meeting participants. The videoconferencing system processes and routes the received AV and info, based on the received control signals, to provide AV and information to meeting participants. The videoconferencing system enables participants to to know details about each breakout room (e.g., what breakout rooms are available, how many people are attending each breakout room, who is attending each breakout room, the topics of the breakout rooms), hear audio, see video, and receive information corresponding breakout rooms that they have not joined, join a breakout room, leave a breakout room, create breakout rooms, invite other participants to join a breakout room, and make a breakout room private.

Advantageously, the disclosed videoconferencing system provides benefits and capabilities not provided by current videoconferening systems. The disclosed videoconferencing system enables meeting participants to receive more AV and info signals than are provided by current videoconferencing systems. For example, meeting participants may receive audio and video signals corresponding to a room, or participants in a room, that they are not assigned to. The disclosed videoconferencing system enables meeting hosts to make more configuration selections than are provided by current videoconferencing systems. For example, a meeting host can choose to provide audio and video signals corresponding to a room, or participants in a room, to a participant that is not assigned to that room. The disclosed videoconferencing system enables meeting participants to create, join, leave a room, make a room private, and invite participants to join a room, options that not available in current videoconferencing systems where only the host can make those configuration selections.

In addition, the disclosed videoconferencing system reduces the resources consumed by the computer systems of the disclosed videoconferencing system and by the computer systems of meeting participants. By reducing the resources consumed, the disclosed videoconferencing system can support more meeting participants, more meeting rooms, more input and/or output AV signals and info signals, and more meeting configuration options while consumer less computer resources (or while consuming a constrained amount of computer resources).

In an embodiment, the videoconferencing system processes the received AV, based on the received control signals, to generate lower quality (e.g., compressed or lower resolution AV signals) corresponding to received AV signals, and provide the lower quality AV to meeting participants.

Advantageously, this embodiment of the disclosed videoconferencing system provides benefits and capabilities not provided by current videoconferening systems. This embodiment of the disclosed videoconferencing system further reduces the resources consumed by the computer systems of the disclosed videoconferencing system and by the computer systems of meeting participants. By reducing the resources consumed, the disclosed videoconferencing system can support more meeting participants, more meeting rooms, more input and/or output AV signals and info signals, and more meeting configuration options while consumer less computer resources (or while consuming a constrained amount of computer resources).

DETAILED DESCRIPTION

Embodiments of the invention include a method, a system, and a non-transitory computer-readable storage medium storing computer-executable instructions for enabling participants of a videoconference to know details about each available breakout room (e.g., what breakout rooms are available, how many people are attending each breakout room, who is attending each breakout room, the topics of the breakout rooms), hear audio and see video of breakout rooms that they have not joined, join a breakout room, leave a breakout room, create breakout rooms, invite other participants to join a breakout room, and make a breakout room private. In addition, embodiments of the invention include a method, a system, and a non-transitory computer-readable storage medium storing computer-executable instructions for enabling reduced quality audio and/or reduced quality video to meeting participants in order to reduce the resources consumed while providing the above capabilities.

Figure 1:
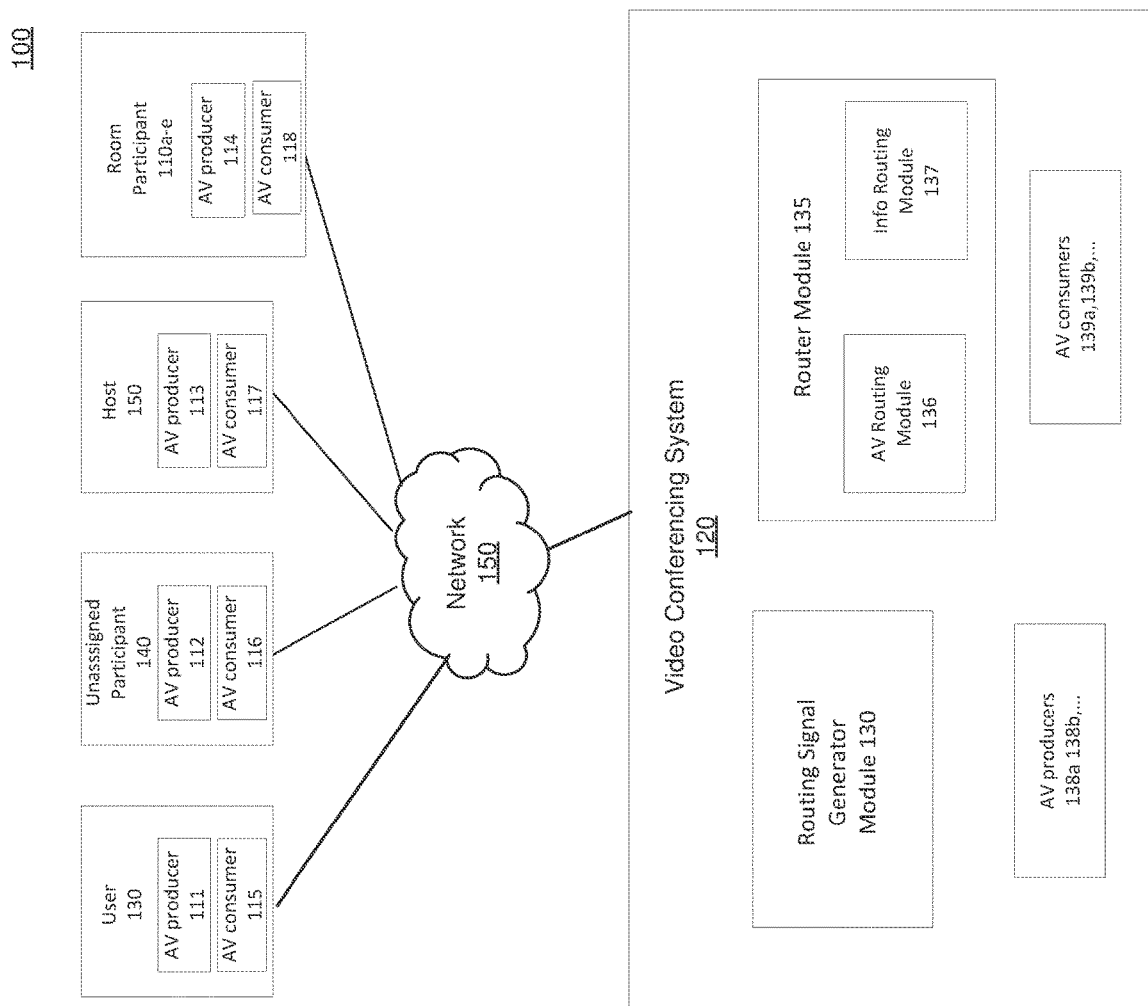
FIG. 1 is a high-level block diagram of a computing environment for an interactive videoconferencing system, in accordance with an embodiment.

FIG. 1 illustrates an example computing environment 100 according to an embodiment of the invention. Computing environment 100 comprises user 130, unassigned participant 140, host 150, room participants 110a-e, and videoconferencing system 120. These elements are connected by communication network 150 such as a local area network, a wide area network, a wireless network, an intranet, a cable network, a satellite network, a cellular phone network, an optical network, the Internet, or combinations thereof. Computing environment 100 may include more, fewer, and/or different elements than the ones shown in FIG. 1. Moreover, the functionalities can be distributed among the elements in a different manner than described here.

Each of user 130, unassigned meeting participant 140, host 150, room participants 110a-e, and videoconferencing system 120 are hosted on a computer, as described with reference to FIG. 9.

Each of user 130, unassigned meeting participant 140, host 150, and room participants 110a-e may comprise an AV producer (i.e., AV producer 111-114) and/or an AV consumer (i.e., AV consumer 115-118). An AV producer may comprise an audio producer and/or a video producer. An audio producer is a resource, such as an API, that enables transmission of an audio signal produced a first entity (e.g., user 130) to a second entity (e.g., videoconferencing system 120). A video producer is a resource, such as an API, that enables transmission of a video signal produced by a first entity to a second entity. An AV consumer may comprise an audio consumer and/or a video consumer. An audio consumer is a resource, such as an API, that enables reception of an audio signal produced by a first by a second entity. A video consumer is a resource, such as an API, that enables reception of a video signal produced by a first entity by a second entity.

Videoconferencing system 120 comprises routing signal generator module 130 and router module 135. Videoconferencing system 120 may comprise AV producers 138a, b, etc. and/or AV consumers 139a, b, etc. Videoconferencing system 120 receives input signals and provides output signals via communications network 150. Videoconferencing system 120 may include additional, fewer, and/or different modules than the ones shown in FIG. 1. Moreover, the functionalities can be distributed among the modules in a different manner than described here. Videoconferencing system 120 is described in more detail with respect to FIG. 2 below.

Figure 2:
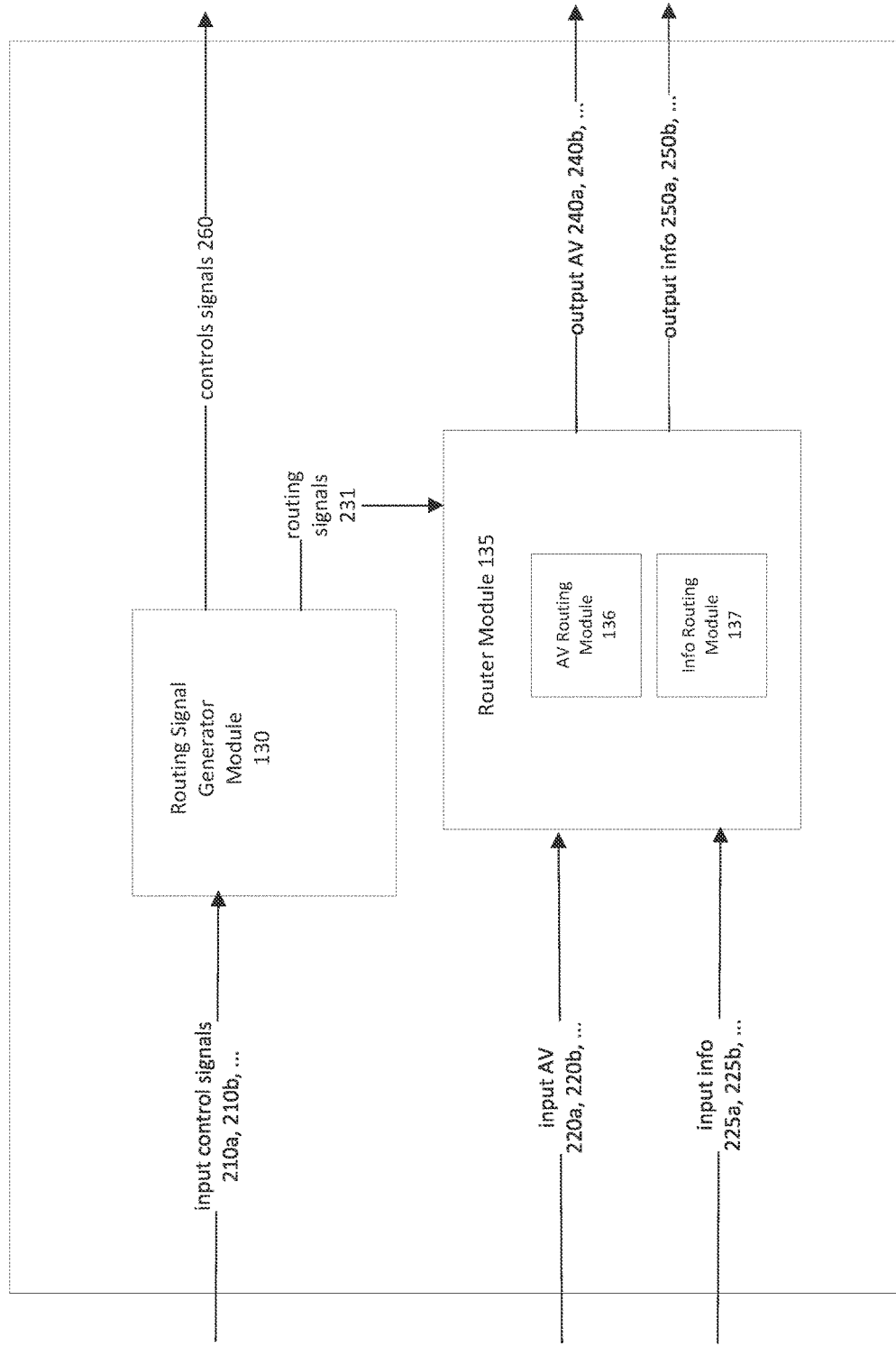
FIG. 2 is a high-level signal flow diagram of an interactive videoconferencing system, in accordance with an embodiment of the invention.

FIG. 2 illustrates a signal flow diagram for videoconferencing system 120, according to an embodiment of the invention. Videoconferencing system 120 comprises routing signal generator module 130 and router module 135. Videoconferencing system 120 may comprise AV producers 138a, b, etc. and/or AV consumers 139a, b, etc. (not shown in FIG. 2). Videoconferencing system 120 receives input signals and provides output signals via communications network 150.

Videoconferencing system 120 may include additional, fewer, and/or different modules than the ones shown in FIG. 2. Moreover, the functionalities can be distributed among the modules in a different manner than described here.

Videoconferencing system 120 receives input control signals 210a, 210b, etc. from meeting participants. Meeting participants may comprise room participants 110a-e, user 130, unassigned participant 140, and host 150. Each of input control signals 210a, 210b, etc., corresponds to one of the meeting participants. Input control signals 210a, 210b, etc., comprise signals transmitting selections made or actions taken by the corresponding meeting participant. In an example, input control signals 210a may comprise input control signals from user 130. In this example, input control signals 210a may comprise signals transmitting room selections, and audio and video selections made by user 130. In another example, input control signals 210b may comprise input control signals from host 150. In this example, input control signals 210b may include signals transmitting room selections and audio and video selections made by host 150. Input control signals 210b may also comprise signals from host 150 transmitting configuration settings of the meeting, such as the number of rooms, room information, configuration of audio and video options for rooms and participants, assignment of participants to rooms, assignment (or designation) of room participants to be presenters, and other selections or actions made by host 150.

Videoconferencing system 120 receives input audio and visual signals ("AV") 220a, 220b, etc. from the meeting participants, including room participants 110a-e, user 130, unassigned participant 140, and host 150. Each of input AV 220a, 220b, etc., corresponds to one of the meeting participants. Each of input AV 220a, 220b, etc., comprises the audio and/or video signals corresponding to the respective participant. Audio signals may comprise audio received from a microphone and/or audio recording device and/or audio projecting device (e.g., an audio feed when the respective participant is sharing their screen). Video signals may comprise video signals from a camera and/or display signals received from a computing device (e.g., a screen display when the respective participant is sharing their screen). Input AV 220a, 220b, etc., may be processed by an AV producer and/or consumer (e.g., AV producers 138a, 138b, etc., AV consumers 239a, 239b, etc.; not shown in FIG. 2).

Videoconferencing system 120 receives input information ("input info") 225a, 225b, etc. from the meeting participants, including room participants 110a-e user 130, unassigned participant 140, and host 150. Each of input info 225a, 225b, etc., corresponds to one of the meeting participants. Each of input info 225a, 225b, etc., comprises information corresponding to the respective participant. In an example, input info 225a may comprise input info corresponding to user 130. In this example, input info 225a may comprise signals transmitting user name, biographical information, and/or photo of user 130. In an example, input info 225b may comprise input info from host 150. In this example, input info 225b may comprise signals from host 150 transmitting host 150 name, biographical information, and/or photo of host 150. Input info 225b may also comprise signals transmitting meeting information such as name, topic, etc., and room information such as room name, room topic, maximum number of participants, etc., provided by host 150.

Routing signal generator module 130 comprises a logic processor such as a CPU. Routing signal generator module 130 executes instructions to process input control signals 210a, 210b, etc., and generate output signals control signals 260 and routing signals 231. Controls signals 260 are provided by videoconferencing system 120 to configure the options available to the meeting participants, as described below. Routing signals 231 are used by router module 135 to generate output signals output AV 240a, 240b, etc., and output info 250a, 250b, etc., as described below.

Router module 135 routes input AV 220a, 220b, etc., and input info 225a, 225b, etc., to the appropriate meeting participants to configure the meeting, configure rooms, and provide appropriate audio, video, and information to meeting participants based on routing signals 231. Router module 135 comprises AV routing module 336 and info routing module 337. Router module 135 may include additional, fewer, and/or different modules than the ones shown in FIG. 2. Moreover, the functionalities can be distributed among the modules in a different manner than described here.

AV routing module 136 comprises an AV router which receives input AV signals (or input media streams) 220a, 220b, etc., determines which AV signals are to be provided to which meeting participants based on routing signals 231, and provides output AV signals (or output AV streams) 240a, 240b, etc. Input AV 220a, 220b, etc., and/or output AV 240a, 240b, etc., may be processed by an AV producer and/or consumer (e.g., AV producers 138a, 138b, etc., AV consumers 139a, 139b, etc.; not shown in FIG. 2). AV routing module may comprise a selective forwarding unit router ("SFU"). Advantageously, using an SFU instead of a mesh architecture router reduces the number of connections required between participants and videoconferencing system 120 and allows larger numbers of participants. Advantageously, using an SFU instead of a multipoint conferencing unit ("MCU") architecture router reduces the processing capability required of videoconferencing system 120.

Output AV 240a, 240b, etc., comprises output AV signals corresponding to individual meeting participants and/or to groups of meeting participants. In an example, output AV 240a may comprise AV signals corresponding to a meeting participant assigned to a breakout room ("meeting participant AV") and output AV 240b may comprise AV signals corresponding to all meeting participants assigned to the breakout room ("breakout room AV"). Breakout room AV may comprise AV signals from all meeting participants assigned to the breakout room; breakout room AV may only comprise AV signals from one meeting participant (e.g., a designated presenter in the breakout room).

Info routing module 137 comprises a router which receives multiple input info streams, determines what info is to be provided to which meeting participants based on routing signals 231, and provides output info signal 250a, 250b, etc. Info routing module 137 may comprise an SFU. Info routing module 137 may comprise a router based on a different routing architecture. Info routing module 137 may be a non-AV router. Advantageously, using a non-AV router for info routing module 137 reduces the processing capability required of videoconferencing system 120 because the use of a non-AV router eliminates the need to route audio/video signals.

The manner in which router module 135 routes input AV 220a, 220b, etc., and input info 225a, 225b, etc., to the appropriate meeting participants based on routing signals 231 will further be described with respect to FIGS. 3-7 below.

Figure 3:
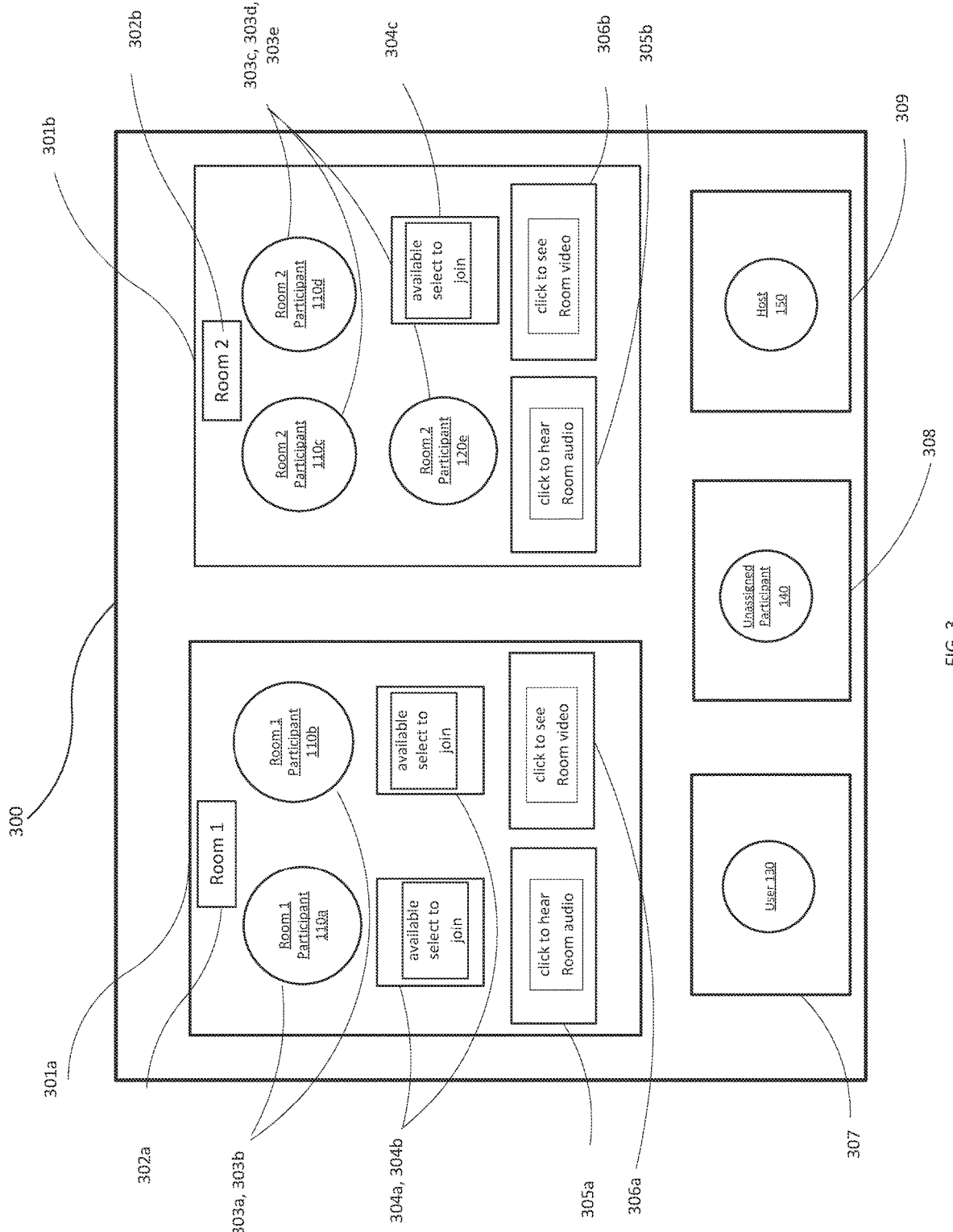
FIG. 3 is an example of a meeting interface, in accordance with an embodiment of the invention.

FIG. 3 illustrates meeting interface 300 of a videoconferencing system, according to an embodiment of the invention. Meeting interface 300 enables user 130 to view information and make selections corresponding to participants and breakout rooms ("rooms") in a meeting. Meeting interface 300 comprises the following interfaces: room interfaces 301 (e.g., room interfaces 301a and 301b), user interface 307, unassigned participant interface 308, and host interface 309. The interfaces illustrated in FIG. 3 may be graphical interfaces which provide information that is viewable in the interfaces. The interfaces illustrated in FIG. 3 may be interactive interfaces which can react to a selection made by user 130, such as a click on the interface, to enable information to be viewed in the interface or to enable a selection, which will be transmitted to videoconferencing system 120 as part of input control signals 210a, 210b, etc. Room interfaces 301a and 301b, user interface 307, unassigned participant interface 308, and host interface 309, are described in more detail with respect to FIGS. 4-7. Meeting interface 300 may include more, fewer, and/or different interfaces than the ones shown in FIG. 3. Moreover, the functionalities can be distributed among the interfaces in a different manner than described here.

Room interfaces 301 (such as room interfaces 301a and 301b) provide information and make selections available to user 130 corresponding to participants in each room in a meeting. FIG. 3 illustrates two room interfaces 301a and 301b in meeting interface 300. A meeting may have more or fewer rooms and meeting interface 300 may have more or fewer room interfaces. Room interfaces 301a and 301b comprise the following interfaces: room information interfaces 302a and 302b, room participant interfaces 303a-303e, room available position interfaces 304a-304c, room audio interfaces 305a and 305b, and room video interfaces 306a and 306b. Room interfaces 301a and 301b may include more, fewer, and/or different interfaces than the ones shown in FIG. 3. Moreover, the functionalities can be distributed among the interfaces in a different manner than described here.

Room information interfaces 302 (such as room information interfaces 302a and 302b) provide information about each room. Such information might comprise, for example, names assigned to the rooms such as "Room 1" and "Room 2." Room participant interfaces 303 (such as room participant interfaces 303a-303e) provide information, audio, and video corresponding to room participants 110a, 110b, etc., and makes selection available corresponding to room participants 110a, 110b, etc. Room available position interfaces 304 (such as room available position interfaces 304a-304c) provide information, audio, and video corresponding to room available positions, and makes selections available corresponding to room available positions. Room audio interfaces 305 (such as room audio interfaces 305a and 305b) enable audio to be provided to user 330 and make selections available corresponding to the audio of each room. Room video interfaces 306 (such as room video interfaces 306a and 306b) provide video to user 130 and make selections available corresponding to the video of each room. Room information interfaces 301 are described further with respect to FIG. 4.

User interface 307, unassigned participant interface 308, and host interface 309 provide information, audio, and video corresponding to user 130, unassigned participant 140 and host 150 respectively, and make selections available to user 130, unassigned participant 140, and host 150. User interface 307, unassigned participant interface 308, and host interface 309 are described further with respect to FIGS. 5-7.

User 130 joins a meeting such as the meeting illustrated in FIG. 3 provided by the videoconferencing system 120. In some embodiments, user 130 joins a meeting created and hosted by host 150 (i.e., created and hosted by another user of the videoconferencing system). User 130 may join a meeting hosted by host 150 by logging into the videoconferencing system and selecting a pre-existing meeting, or by selecting a link to the meeting provided by host 150. Alternatively, user 130 may create and join a meeting by logging into the videoconferencing system, configuring a meeting which user 130 will host, and then joining the meeting. Upon joining the meeting, the videoconferencing system provides meeting interface 300 to user 130. User 130 uses room interfaces 301 (such as room interfaces 301a and 301b), unassigned participant interface 308, user interface 308, and host interface 309 to view information, view video and hear audio corresponding to rooms and participants, and to select options corresponding to rooms, participants, and audio and video corresponding to rooms and participants in rooms.

Upon first joining a meeting hosted by host 150, user 130 is an unassigned participant, i.e., unassigned participant 140. Thus, user 130 will be represented as unassigned participant 140 in unassigned participant interface 308 and in user interface 307. As unassigned participant 140, user 130 can view room information interfaces 302a and 302b to receive information about the rooms, such as the agenda for each room. User 130 can view room participant interfaces 303a-303e to receive information about the room participants. Such information may include participant names, biographical information, participant audio, and participant video. User 130 can view room available position interfaces 304a-304c to see how many positions are available in each room. User 130 may view video corresponding to the room through room video interfaces 306a and 306b, e.g., by selecting an option "click to see room video." User 130 may hear audio corresponding to the room, e.g., by selecting an option "click to hear Room audio" in room audio interfaces 305a and/or 305b; the videoconferencing system will then provide the room audio to user 130.

User 130 may choose to join one of the rooms. For example, user 130 may select an option "available select to join" in room available position interface 304a in room interface 301a corresponding to "Room 1." Upon making the selection, user 130 is represented in a new room participant interface 303f (not shown), for example as Room 1 Participant 110f, in room interface 301a corresponding to "Room 1." Upon joining "Room 1," available position interface 304 may be modified to no longer provide an option "available select to join" in room interface 301a corresponding to "Room 1." (For example, available position interface 304a may indicate "position not available." Alternatively, available position interface 304a may no longer be visible in room interface 301a.) After joining a room, user 130 is longer represented in unassigned participant interface 308. User 130 continues to be represented in user interface 340.

As a participant in "Room 1," user 130 will have access to the room and participant information and the audio and video corresponding to Room 1. User 130 may also have access to the room and participant information and the audio and video corresponding to Room 2, and to the room and participant information and the audio and video corresponding to unassigned participants and host 150.

User 130 may choose to leave the current room to join a different room. In this example, user 130, currently in "Room 1," may select the option "available select to join" in room available position interface 304c in room interface 301b corresponding to "Room 2." Upon making the selection, user 130 is represented in a new room participant interface 303g (not shown), for example as Room 2 participant 110g in room interface 301b corresponding to "Room 2." Upon joining "Room 2," available position interface 304c may be modified to no longer provide an option "available select to join in room interface 301b corresponding to "Room 2." Moreover, upon switching from "Room 1" to "Room 2," available position interface 304a may be modified to provide an option "available select to join" in room interface 301a corresponding to "Room 1."

As a participant in "Room 2," user 130 will have access to the room and participant information and the audio and video corresponding to Room 2. User 130 may also have access to the room and participant information and the audio and video corresponding to Room 1, and to the room and participant information and the audio and video corresponding to unassigned participants host 150.

In some embodiments, the user 130 joins a meeting created and hosted by the user 130. Upon first joining a meeting created and hosted by user 130, user 130 is unassigned participant 140 and host 150. Thus, user 130 is represented in unassigned participant interface 308, in user interface 307, and in host interface 150. User 130 as a user can take the same actions described above to view, join, and leave rooms. User 130 as host may take additional actions described below with respect to FIG. 6.

In the example illustrated in FIG. 3, Room 1 participant 110a provides input control signals 210a, comprising signals corresponding to a selection made by Room 1 participant 110a to join Room 1, to videoconferencing system 120. Room 1 participant 110a also provides input AV 220a, comprising audio signals (e.g., from a microphone) and video signals (e.g., from a camera), and provides input info 225a (comprising, for example, participant name and job title) to videoconferencing system 120. Host 150 provides input control signals 210b (comprising for example, signals corresponding to selections made by host 150 to configure the AV signals and info to be provided to meeting participants) to videoconferencing system 120. Host 150 provides input AV 220b, comprising audio signals and video signals. Host 150 provides input info 225b (comprising, for example, host name and job title, meeting name and information, Room 1 name and information, and Room 2 name and information) to videoconferencing system 120. Unassigned participant 140 provides input control signals 210c, input AV 220c, and input info 225c to videoconferencing system 120. User 130 provides input control signals 210d, input AV 220d, and input info 225d to videoconferencing system 120.

In this example, based on received input control signals, videoconferencing system 120 routes and provides to Room 1 participant 110a output AV 240a comprising audio and video signals corresponding to each of the participants in Room 1 (e.g., Room 1 participants 110a and 110b) and audio and video signals corresponding to the room video of Room 1 (e.g., the Room 1 audio/video may comprise audio/video corresponding to all meeting participants in Room 1, or the room audio/video may comprive audio/video corresponding to only one meeting participant in Room 1), output AV 240b comprising audio and video signals corresponding to the room audio and video of Room 2, and output AV 240c comprising audio and video signals corresponding to host 150. Thus, Room 1 participant 110a does not receive audio and video signals corresponding to each of the participants in Room 2 (e.g., Room 2 participants 320a-320c). In this example, based on received input control signals, videoconferencing system 120 provides to Room 1 participant 110a output info 250a comprising info corresponding to each of the participants in Room 1 (e.g., Room 1 participants 110a and 110b), output info 250b comprising Room 2 info, and output info 250c corresponding to host 150 info. Room 1 participant 110a makes selections to determine which received audio to hear, which received video to view, and which received info to view. For example, Room 1 participant 110a may make a selection to not display Room 2 video in Room 2 video interface 306b, or may make a selection to not hear Room 2 audio.

As illustrated in FIGS. 1-3, the disclosed invention enables videoconferencing system 120 to provide different combinations of output AV 240a, 240b, etc., and output info 250a, 250b, etc., to each meeting participant based on the received input control signals 210a, 210b, etc. from meeting participants and the host.

Videoconferencing system 120 as described above provides advantages over current videoconferencing systems. The disclosed videoconferencing system enables meeting participants to receive more AV and info signals than are provided by current videoconferencing systems. For example, meeting participants may receive audio and video signals corresponding to a room, or participants in a room, that they are not assigned to. The disclosed videoconferencing system enables host 150 to make more configuration selections than are provided by current videoconferencing systems. For example, host 150 can choose to provide audio and video signals corresponding to a room, or participants in a room, to a participant that is not assigned to that room. The disclosed videoconferencing system enables meeting participants to join or leave a room, an option that is not available in current videoconferencing systems where only host 150 can assign participants to room. The disclosed videoconferencing system enables meeting participants to join or leave a room at any time during the meeting, an option that is not available in current videoconferencing systems. The disclosed videoconferencing system enables meeting participants to create a room and invite participants to a room, options not available in current videoconferencing systems.

By using input control signals 210a, 210b, etc., to limit the AV and info signals that meeting participants receive, the disclosed videoconferencing system is able to reduce the resources (such as processing and storage resources) used by the computer systems of routing signal generator module 130, AV routing module 136, and info routing module 137, to provide output AV and output info. Furthermore, by reducing the resources consumed, the disclosed videoconferencing system may be able to support more meeting participants, more meeting rooms, and/or or more input and/or output AV signals while using a constrained amount of routing signal generator module 130, AV routing module 336, and info routing module 337 resources.

Videoconferencing system 120 as described above, by using input control signals 210a, 210b, etc., to limit the AV and info signals that meeting participants receive, may require fewer AV producers and/or consumers (and/or fewer resources in AV producers and/or consumers) in the computers hosting user 130, unassigned participant 140, host 150, room participant 11a-e, and videoconferencing system 120. By requiring fewer AV producers and/or consumers (and/or fewer resources in AV producers and/or consumers), the disclosed videoconferencing system may be able to support more meeting participants, more meeting rooms, and/or more sources of input and/or output AV signals using a constrained number of AV producers and/or consumers (or using AV producers and/or consumers having constrained resources).

Figure 4:
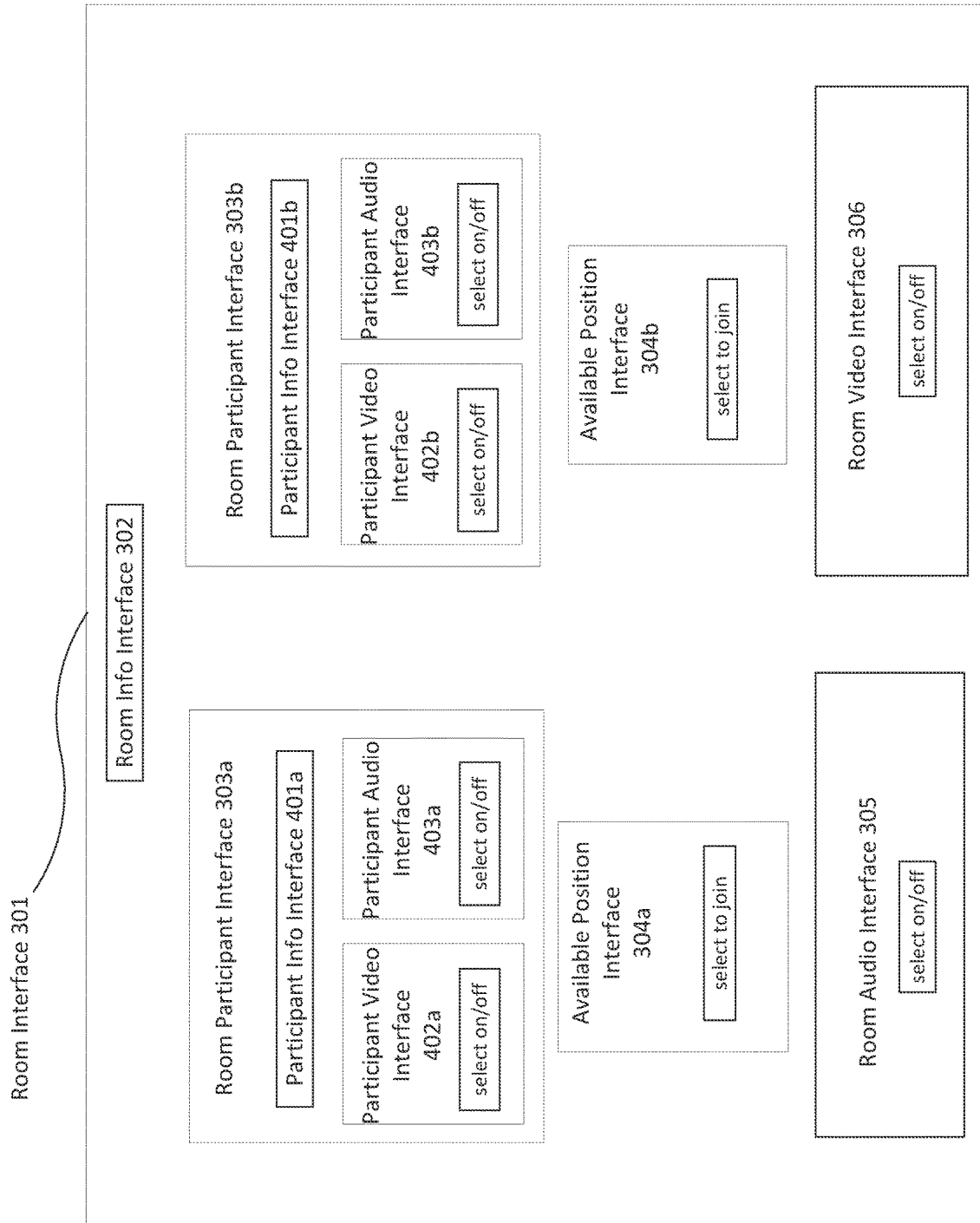
FIG. 4 is an example of a room interface, in accordance with an embodiment of the invention.

FIG. 4 is an illustration of room interface 301, according to an embodiment of the invention. Room interface 301 corresponds to room interfaces 301a and 301b in FIG. 3. Room interface 301 provides information and make selections available to user 130 corresponding to rooms and participants in a meeting (e.g., the meeting represented in FIG. 3), according to control signals 260 received from videoconferencing system 120. Room interface 301 comprises the following interfaces: room information interface 302, room participant interfaces 303a and 303b, room available position interfaces 304 (such as room available position interfaces 304a-304b), room audio interfaces 305, and room video interfaces 306. The interfaces illustrated in FIG. 4 may be graphical interfaces which provide information that is viewable in the interfaces. The interfaces illustrated in FIG. 4 may be interactive interfaces which can react to a selection made by user 130, such as a "click" on the interface, to enable information to be viewed in the interface or to enable a selection, which will be transmitted to videoconferencing system 120 as part of input control signals 210a, 210b, etc. Room interface 301 may include more, fewer, and/or different interfaces than the ones shown in FIG. 4. Moreover, the functionalities can be distributed among the interfaces in a different manner than described here.

Room info interface 302 provides information related to a room such as room name, room topic, or room capacity. Room info interface 302 may react to a selection made by user 130 to show or not show information related to the room in room info interface 302.

Room participant interfaces 303a and 303b provide information and audio and video corresponding to a participant in a room (e.g., Room 1 participants 110a and 110b in FIG. 3). Room participant interfaces 303a and 303b comprise participant info interfaces 401a and 401b, participant video interfaces 402a and 402b, and participant audio interfaces 403a and 403b. Room participant interfaces 303a and 303b may include more, fewer, and/or different interfaces than the ones shown in FIG. 4. Moreover, the functionalities can be distributed among the interfaces in a different manner than described here.

Participant info interfaces 401a and 401b each provide information corresponding to a room participant, such as name, title, or photo. Participant info interfaces 401a and 401b may react to a selection made by user 130 (e.g., "select on/off") to show or not show corresponding participant information in participant info interfaces 401a and 401b.

Participant video interfaces 402a and 402b each provide video corresponding to a room participant. Participant video interfaces 402a and 402b may react to a selection made by user 130 (e.g., "select on/off") to show or not show corresponding participant video in participant video interfaces 402a and 402b.

Participant audio interfaces 403a and 403b each enable audio corresponding to a room participant to be provided to an appropriate audio device to be heard by user 130. Participant audio interfaces 403a and 403b may react to a selection made by user 130 (e.g., "select on/off") to provide or not provide the corresponding participant audio to an appropriate audio device to be heard by user 130.

Available position interfaces 304a and 304b provide information corresponding to available positions in each room. Available position interfaces 304a and 304b may react to a selection made by user 130 (e.g., "select to join") to enable user 130 to join the meeting (i.e., provide control signals to videoconferencing system 120 to generate and provide output AV and output info based on the room selection made by user 130).

Room audio interface 305 enables audio corresponding to a room to be provided to an appropriate audio device to be heard by user 130. Room audio may comprise audio from one or more room participants. For example, room audio may comprise the audio provided by a microphone from one of the participants, audio provided by a microphone from each of the participants, or audio provided by sharing a room participant's computer audio. The configuration of the room audio is determined by control signals provided by host 150 and room participants. Room audio interface 305 may react to a selection made by user 130 (e.g., "select on/off") to enable the corresponding room audio to be provided to an audio device to be heard by user 130.

Room video interface 306 provides video corresponding to a room. Room video may comprise video from one or more room participants. For example, room video may comprise the video provided by a camera from one of the participants, video provided by a camera from each of the participants, and/or or video provided by sharing a room participant's computer display. The configuration of the room video is determined by control signals provided by host 150 and room participants. Room video interface 306 may react to a selection made by user 130 (e.g., "select on/off") to enable the corresponding room video to be shown or not shown in room video interface 306.

In each of the interfaces described above, the ability of user 130 to see info or video or to hear audio is limited by output AV 240a, 240b, etc., output info 250a, 250b, etc., and by control signals 260 provided by videoconferencing system 120 and received by user 130. In an example where user 130 is assigned to Room 1, host 150 may provide control signals 210a to videoconferencing system 120 to enable user 130 to see room info corresponding to Room 2 but disable user 130 from receiving Room 2 audio or Room 2 video. (Videoconferencing system 120 may make Room 2 audio interface 305b/video interface 306b invisible to user 130 or may not provide a selection option Room 2 audio interface 305b/video interface 306b (e.g., the selection option may be grayed out)).

Figure 5:
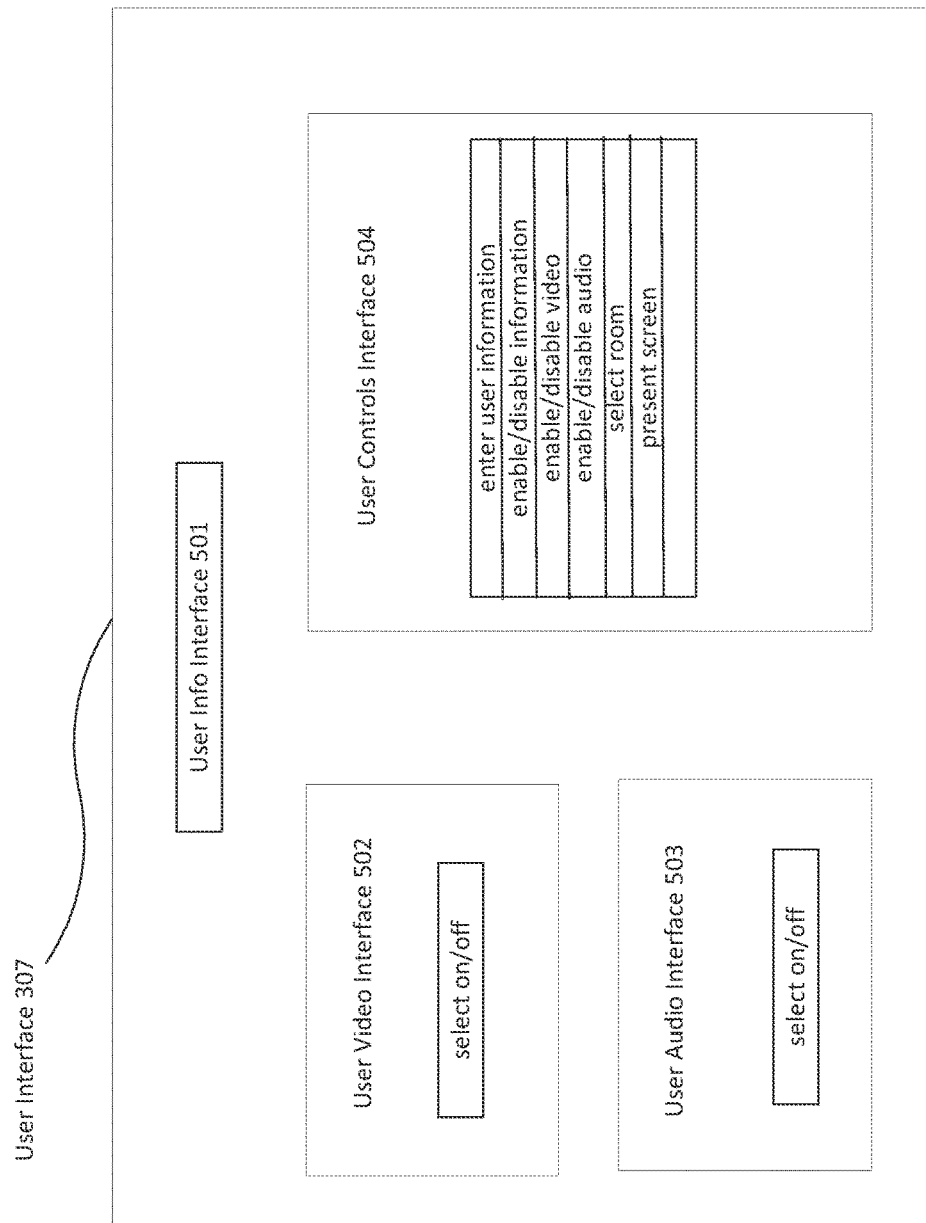
FIG. 5 is an example of a user interface, in accordance with an embodiment of the invention.

FIG. 5 is an illustration of user interface 307, according to an embodiment of the invention. User interface 307 corresponds to user interface 307 in FIG. 3. User interface 307 provides information and makes selections available to user 130 in a meeting (e.g., the meeting represented in FIG. 3). User interface 307 also provides options for user 130 to make selections to view/hear audio and video corresponding to participants in a meeting, to join/leave rooms, and to make their info, audio, and video available to other meeting participants. User interface 307 comprises the following interfaces: user info interface 501, user video interface 502, user audio interface 503, and user control interface 504. The interfaces illustrated in FIG. 5 may be graphical interfaces which provide information that is viewable in the interfaces. The interfaces illustrated in FIG. 5 may be interactive interfaces which can react to a selection made by user 130, such as a click on the interface, to enable information to be viewed in the interface or to enable a selection, which will be transmitted to videoconferencing system 120 as part of input control signals 210a, 210b, etc. User interface 307 may only be visible to user 130 in meeting interface 100. User interface 307 may include more, fewer, and/or different interfaces than the ones shown in FIG. 5. Moreover, the functionalities can be distributed among the interfaces in a different manner than described here.

User info interface 501 provides information corresponding to user 130 such as name, title, or photo. User info interface 501 may react to a selection made by user 130 (e.g., "select on/off") to provide some or all of user 130 info to be shown or not shown in user info interface 501.

User video interface 502 provides video corresponding to user 130. User video interface 502 may react to a selection made by user 130 (e.g., "select on/off") to provide user 130 video to be shown in user 130 video interface 502.

User audio interface 503 enables audio corresponding to user 130 to be provided to an appropriate audio device to be heard by user 130. User 130 audio interface 503 may react to a selection made by user 130 (e.g., "select on/off") to provide the corresponding participant audio to an appropriate audio device to be heard by user 130.

User control interface 504 enables user 130 to enter information, enable/disable access to their info/audio/video, and make selections. User control interface 504 may comprise more, fewer, or different options than illustrated in FIG. 5.

In some embodiments, user control interface 504 includes a "enter information" user interface element (such as a button). User 130 may select "enter information" to enter information such as name, title, photo, contact information, etc. Selecting "enter information" may open a different interactive graphical interface to enter information. Moreover, in some embodiments, user control interface 504 includes a set of "enable/disable" user interface elements. User 130 may select "enable/disable information," "enable/disable video," and "enable/disable audio" to enable/disable meeting participants from seeing user 130 info and/or video and/or hearing user 130 audio. Additionally, user control interface 504 includes a "select room" user interface element and a "present screen" user interface element. User 130 may select "select room" to join a room, such as Room 1 in FIG. 3. User 130 may select "present screen" to provide audio and/or video corresponding to a display on the computer device hosting user 130.

By making selections in user interface 307, user 130 provides input control signals to videoconferencing system 120 corresponding to the selections. Referring to FIGS. 2-3, upon receiving input control signals from user 130 (and input control signals from unassigned participant 140, host 150, and room participants 110*a-e*), routing signal generator 230 generates the appropriate routing signals and provides the routing signals to router module 235. Routing module 235, based the received routing signals 231, provides the appropriate output AV 240*a*, 240*b*, etc., output info 250*a*, 250*b*, etc., to user 130, unassigned participant 140, host 150, and room participants 110*a-e*.

Figure 6:
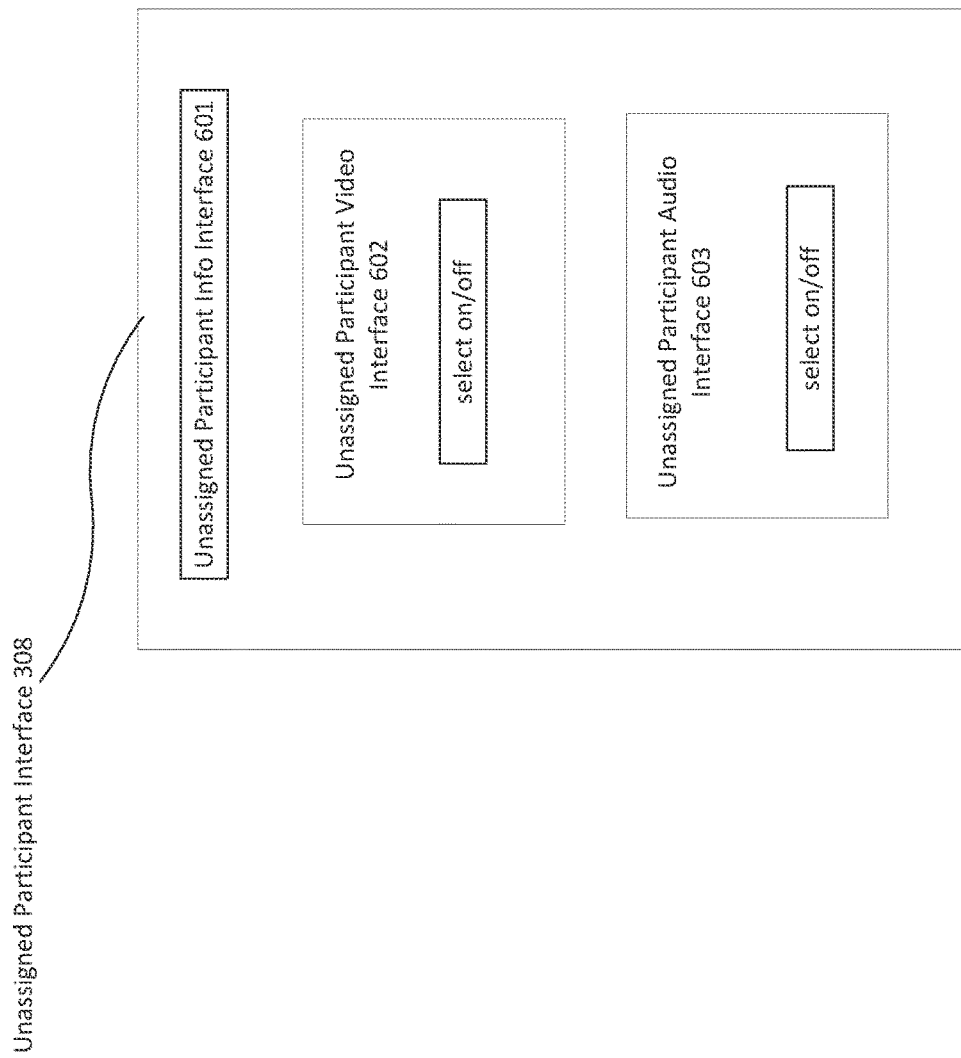
FIG. 6 is an example of an unassigned participant interface, in accordance with an embodiment of the invention

FIG. 6 is an illustration of unassigned participant interface 308, according to an embodiment of the invention. Unassigned participant interface 308 corresponds to unassigned participant interface 308 in FIG. 3. Unassigned participant interface 308 provides information and makes selections available to user 130 corresponding to unassigned participant 140 in a meeting (e.g., the meeting represented in FIG. 3). Unassigned participant interface 308 comprises the following interfaces: unassigned participant info interface 601, unassigned participant video interface 602, and unassigned audio interface 603. The interfaces illustrated in FIG. 6 may be graphical interfaces which provide information that is viewable in the interfaces. The interfaces illustrated in FIG. 6 may be interactive interfaces which can react to a selection made by user 130, such as a click on the interface, to enable information to be viewed in the interface or to enable a selection, which will be transmitted to videoconferencing system 120 as part of input control signals 210*a*, 210*b*, etc. Unassigned participant interface 308 may include more, fewer, and/or different interfaces than the ones shown in FIG. 6. Moreover, the functionalities can be distributed among the interfaces in a different manner than described here.

Unassigned participant info interface 601 provides information corresponding to unassigned participant 140 such as name, title, or photo. Unassigned participant info interface 601 may react to a selection made by user 130 ("e.g., "select on/off") to provide some or all of unassigned participant 140 info in participant unassigned info interface 401.

Unassigned participant video interface 602 provides video corresponding to unassigned participant 140. Unassigned participant video interface 602 may react to a selection made by user 130 (e.g., "select on/off") to provide the unassigned participant 140 video in unassigned participant 140 video interface 602.

Unassigned participant audio interface 603 enables audio corresponding to unassigned participant 140 to be provided to an appropriate audio device to be heard by user 130. Unassigned participant 140 audio interface 603 may react to a selection made by user 130 (e.g., "select on/off") to enable the corresponding participant audio to be provided to an appropriate audio device to be heard by user 130.

Figure 7:
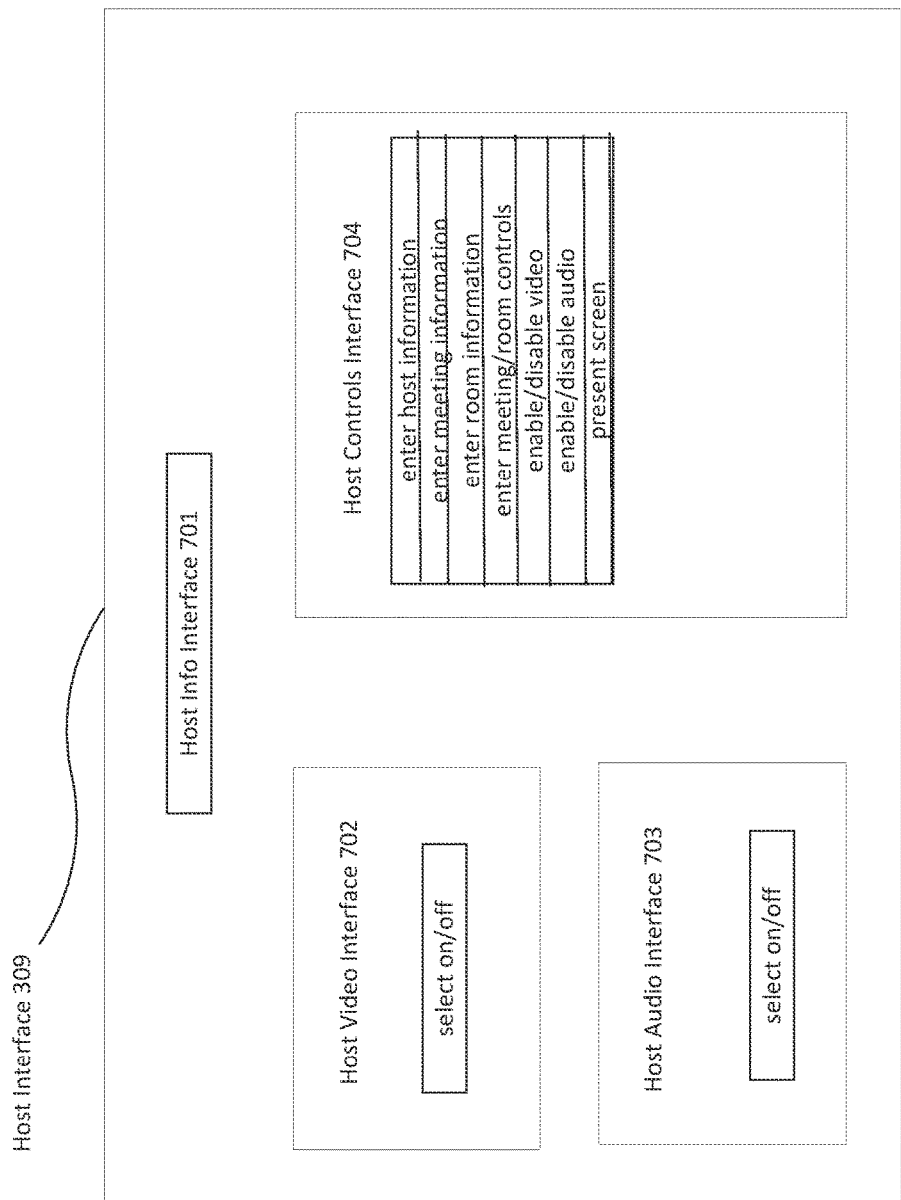
FIG. 7 is an example of a host interface, in accordance with an embodiment of the invention.

FIG. 7 is an illustration of host interface 309, according to an embodiment of the invention. Host interface 309 corresponds to host interface 309 in FIG. 3. Host interface 309 provides information and makes selections available to user 130 and host 150 in a meeting (e.g., the meeting represented in FIG. 1). Host interface 309 also provides options for host 150 to make selections to view/hear audio and video corresponding to participants in a meeting, to join/leave rooms, and to make their info, audio, and video available to other meeting participants. Host interface 309 comprises the following interfaces: host info interface 701, host video interface 702, host audio interface 703, and host control interface 704. The interfaces illustrated in FIG. 7 may be graphical interfaces which provide information that is viewable in the interfaces. The interfaces illustrated in FIG. 7 may be interactive interfaces which can react to a selection made by host 140 or user 130, such as a click on the interface, to enable information to be viewed in the interface or to enable a selection, which will be transmitted to videoconferencing system 120 as part of input control signals 210*a*, 210*b*, etc. Host interface 309 may include more, fewer, and/or different interfaces than the ones shown in FIG. 7. Moreover, the functionalities can be distributed among the interfaces in a different manner than described here.

Host info interface 701 provides information corresponding to host 140 such as name, title, or photo. Host info interface 601 may react to a selection made by user 130 ("e.g., "select on/off") to provide some or all of host 140 info in host info interface 701.

Host video interface 702 provides video corresponding to host 140. Host video interface 702 may react to a selection made by user 130 (e.g., "select on/off") to show host 140 video in host video interface 702.

Host audio interface 703 enables audio corresponding to host 140 to be provided to an appropriate audio device to be heard by user 130. Host audio interface 703 may react to a selection made by user 130 (e.g., "select on/off") to enable the corresponding participant audio to be provided to an appropriate audio device to be heard by user 130.

Host control interface 704 enables host 150 to enter information, enable/disable access to their info/audio/video, and make selections. Host control interface 704 may only be visible to host 150. Host control interface 704 may include an "enter host information" user interface element, an "enter meeting information" user interface element, an "enter room information" user interface element, "an enter meeting/room control" user interface element, an "enable/diable video" user interface element, an "enable/diable audio" user interface element, and a "present screen" user interface element. Host 150 may select "enter host information" to enter host information such as name, title, photo, contact information, etc. Selecting "enter information" may open a different interactive graphical interface to enter information. Host 150 may select "enable/disable information" (not shown) to enable/disable meeting participants from viewing host information.

Host 150 may select "enter meeting information" to enter meeting information such as title, topic, host, day, time, duration, maximum number of participants, etc., and may select "enter room information" to enter room information such as title, topic, designated presenter, and maximum number of participants, etc. Selecting "enter meeting information" and "enter room information" may open a different interactive graphical interface to enter information. Host 150 may select "enable/disable meeting information" and "enable/disable room information" (not shown) to enable/disable meeting participants from viewing host information.

Host 150 may select "enter meeting/room controls" to enter meeting and room control information. Host 150 may use meeting/room controls to create a room, invite participants to a room, and/or enable/disable info/audio/video for meeting participants. Host 150 may use meeting/room controls to control options available to participants to create rooms, join/leave rooms, and enable/disable info/audio/video for meeting participants. Host 150 may use room controls to control options available to participants to present their screen, act as lead presenter in a room, and enable/disable info/audio/video for room participants. Host 150 may use meeting/room controls to make a room private. When a room is private, access to corresponding audio/video may be limited to room participants (or invited room participants) only. When a room is private it may not be visible to non-room participants (or non-invited room participants) in meeting interface 300. (In an embodiment, user 130 may have the ability to create rooms, invite participants, and control access to room audio and/or video, including making a room private. In this embodiment, user controls interface 504 comprises "enter room information" and "enter room controls" options; not shown in FIG. 5). By selecting room or meeting controls, host 150 provides input control signals 210a to videoconferencing system 120 indicating the selections. Referring to FIG. 3, upon receiving input control signals 210a from host 150 (and input control signals 210b, 210c, etc., from other meeting participants), routing signal generator 230 generates the appropriate routing signals and provides them to router module 235. Router module 135, based the received routing signals 231, provides the appropriate output AV 240a, 240b, etc., output info 250a, 250b, etc., and control signals 260. In one example, host 150 may assign participants to room and disable the options for participants to join/leave rooms. In another example, host 150 may enable the options for participants to join/leave rooms but may limit the options to act as assigned or designated room presenter to particular participants.

By making selections in host interface 309, host 150 provides input control signals to videoconferencing system 120 corresponding to the selections. Referring to FIG. 2, upon receiving input control signals from host 150 (and input control signals from user 130, unassigned participant 140, and room participants 110a-e), routing signal generator 230 generates the appropriate routing signals and provides them to router module 235. Routing module 235, based the received routing signals 231, provides the appropriate output AV 240a, 240b, etc., output info 250a, 250b, etc., to user 130, unassigned participant 140, host 150, and room participants 110a-e.

Figure 8:
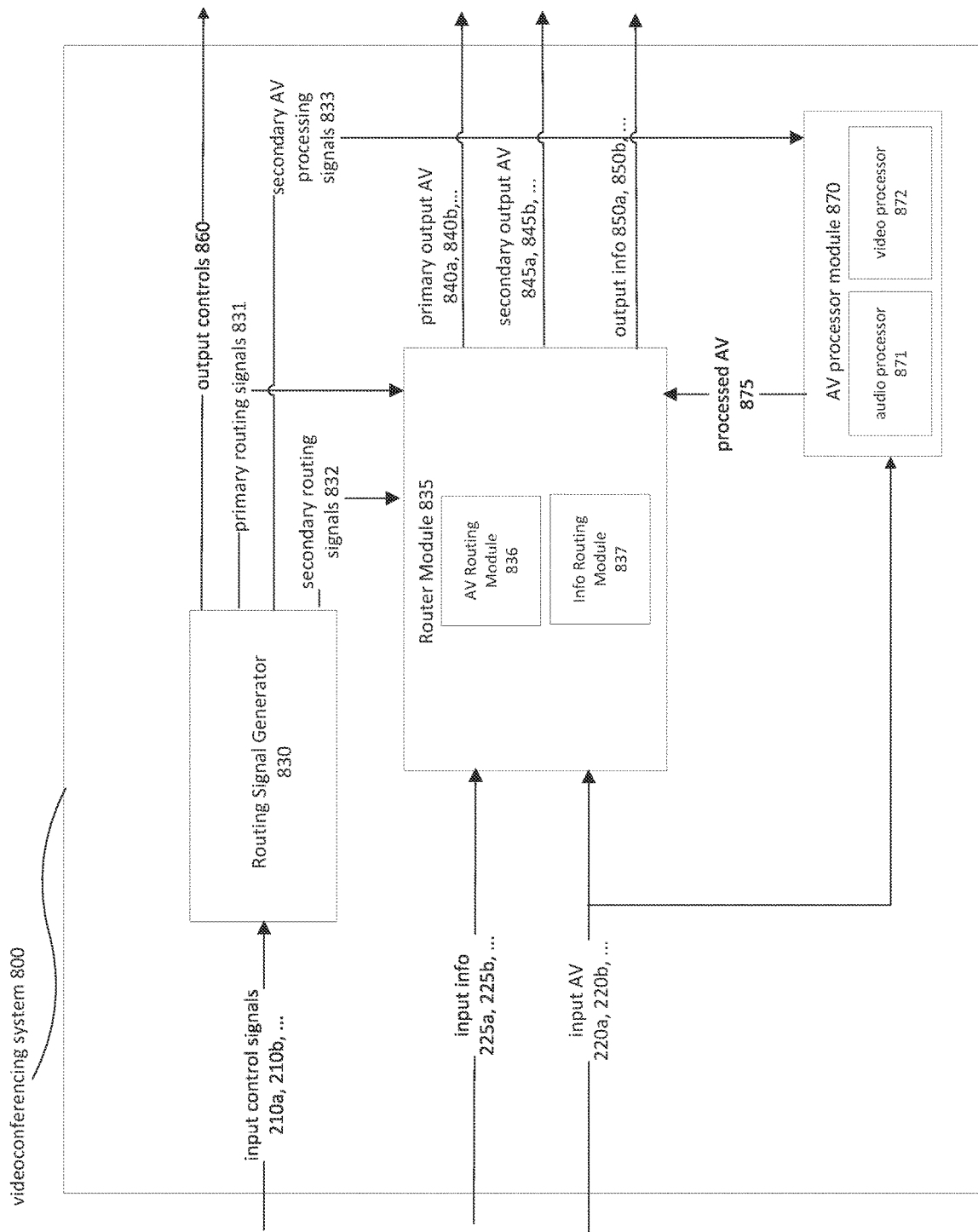
FIG. 8 is a high-level block diagram of an interactive videoconferencing system, in accordance with another embodiment of the invention.

FIG. 8 illustrates videoconferencing system 800, as an alternative to videoconferencing system 120, according to an embodiment of the invention. Videoconferencing system 800 is hosted on a computer, as described with reference to FIG. 9. Videoconferencing system 800 receives input signals (input control signals 210a, 210b, etc., input AV 220a, 220b, etc., and input info 225a, 225b, etc.) from meeting participants and provides output signals (primary output AV 840a, 840b, etc., secondary output AV 845a, 845b, etc., output info 850a, 850b, and output control signals 860) to meeting participants. Videoconferencing system 800 comprises routing signal generator module 830, router module 835, and AV processor module 870. Videoconferencing system 800 may comprise AV producers and/or AV consumers. Primary output AV 840a, 840b, etc., comprises high quality audio and video signals while secondary output AV 845a, 845b, etc., comprise audio and video signals of lower quality (e.g., compressed or lower resolution AV signals) than primary output AV 840a, 840b, etc. Advantageously, this embodiment may reduce resources used by meeting participants and/or videoconferencing system 800 to send and receive audio and/or video signals, or may enable a larger number of participants to participate in a meeting using a given amount of resources. Videoconferencing system 800 may include additional, fewer, and/or different modules than the ones shown in FIG. 8. Moreover, the functionalities can be distributed among the modules in a different manner than described here.

Routing signal generator module 830 comprises a logic processor, such the logic processor described above with respect routing signal generator module 130 of FIGS. 1-2. Routing signal generator module 830 executes instructions to process input control signals 210a, 210b, etc., and generate primary routing signals 831, secondary routing signals 832, and control signals 860, as described above with reference to input control signals 210a, 210b, etc., routing signals 231, and control signals 260 of FIG. 2. Primary routing signals 831 are used by router module 835 to generate primary output signals AV 840a, 840b, etc. Secondary routing signals 831 are used by router module 835 to generate secondary output AV 845a, 845b, etc. Control signals 860 are provided by videoconferencing system 800 to configure the options available to the meeting participants, as described with respect to control signals 260 of FIG. 2. Routing signal generator module 830 may comprise additional, fewer, and/or different modules than the ones shown in FIG. 8. Moreover, the functionalities can be distributed among the modules in a different manner than described here.

AV processor module 870 processes input AV 220a, 220b, etc., to generate processed AV 875. Processed AV 875 corresponds to input AV 220a, 220b, etc.; however, processed AV 875 comprises AV signals of a lower quality than input AV 220a, 220b, etc. In an example, processed AV 875 may be compressed versions of input AV 220a, 220b, etc. In another example, processed AV 875 may be lower resolution versions of input AV 220a, 220b, etc. AV processor module 870 comprises audio processor 871 and video processor 872. AV processor module 870 uses secondary AV processing signals to determine which AV signals of input AV 220a, 220b, etc., to process and how to process them (e.g., with more or less compression or resolution). Audio processor 871 processes the audio signals of input AV 220a, 220b, etc., and video processor 872 processes the video signals of input AV 220a, 220b, etc., to generate processed AV 875. In an embodiment (not shown), AV processor module 870 may receive primary routing signals 831 and secondary routing signals 832. In this embodiment, AV processor module 870 may use primary routing signals 831 and secondary routing signals 832 to determine which AV signals of input AV 220a, 220b, etc., to process and how to process them (e.g., with more or less compression or resolution). AV processor module 875 may comprise additional, fewer, and/or different modules than the ones shown in FIG. 8. Moreover, the functionalities can be distributed among the modules in a different manner than described here.

Router module 835 routes input AV 220a, 220b, etc., processed AV signals 875, and input info 225a, 225b, etc., to the appropriate meeting participants to configure the meeting, configure rooms, and provide appropriate audio, video, and information to meeting participants based on primary routing signals 831 and secondary routing signals 832. Router module 835 comprises AV routing module 836, such as described above with respect to router module 136 of FIGS. 1-2, and info routing module 837, such as described above with respect to info routing module 137 of FIGS. 1-2. Router module 835 may comprise additional, fewer, and/or different modules than the ones shown in FIG. 8. Moreover, the functionalities can be distributed among the modules in a different manner than described here.

The manner in which router module 835 routes input AV 220a, 220b, etc., and input info 225a, 225b, etc., to the appropriate meeting participants based on primary routing signals 831 and secondary routing signals 832, will be described in view of the example of the embodiment corresponding to FIG. 3. In this example, Room 1 participant 110a (represented in room interface 303a) provides input control signals 210a, comprising signals corresponding to a selection made by Room 1 participant 110a to join Room 1, input AV 320a, comprising audio signals and video signals, and input info 325a. Host 150 provides input control signals 210b, comprising signals corresponding to selections made by host 150 to configure the AV signals and info to be provided to meeting participants, input AV 320b, comprising audio signals and video signals, and input info 325b. Unassigned participant 140 provides input control signals 210c, input AV 320c, and input info 325c. User 130 provides input control signals 210d, input AV 320d, and input info 325d.

In this example, based on received input control signals, videoconferencing system 800 routes and provides to Room 1 participant 110a output AV 840a and primary output info 850a. Primary output AV 840a comprises audio and video signals corresponding to each of the participants in Room 1 and audio and video signals corresponding to the Room 1 audio and video. Primary output AV 840b comprises audio and video signals corresponding to each of the participants in Room 2 and audio and video signals corresponding to the Room 2 audio and video. Primary output AV 840c comprises audio and video signals corresponding to Host 150. Secondary output AV 845a comprises audio and video signals corresponding to the room audio and video of Room 2. Secondary output AV 845b comprises audio and video signals corresponding to host 150. Secondary output AV 845a and AV 845b comprises lower quality AV signals corresponding to input AV 220a, 220b, etc. (e.g., compressed AV or lower resolution AV). Output info 850a comprises info corresponding to each of the participants in Room 1, info corresponding to Room 1, info corresponding to Room 2, and info corresponding to host 150. Room 1 participant 110a receives from videoconferencing system 800 primary output AV 840a (i.e., high quality AV corresponding to Room 1), secondary output AV 845a (i.e., lower quality AV corresponding to Room 2), secondary output AV 845c (i.e., lower quality AV corresponding to the host), and output info 850a. Room 1 participant 110a makes selections to determine which received audio to hear, which received video to view, and which received info to view, as described above with respect to FIG. 3. In other examples, videoconferencing system 800 provides different combinations of primary output AV 840a 840b, etc., secondary output AV 845a, 845b, etc., and output info 850a, 850b, etc., to each meeting participant based on the received input control signals 210a, 210b, etc.

Videoconferencing system 800, according to this embodiment of the invention, provides advantages over current videoconferencing systems. In addition to the advantages described with respect to the videoconferencing system of FIGS. 1-7, videoconferencing system 800 is able to provide processed AV signals to meeting participants using fewer resources (such as processing and storage resources) in the computing systems of routing signal generator module 730, AV routing module 836, and/or info routing module 837. For example, AV routing module 836 may consume fewer resources when some routed AV signals are lower quality (e.g., compressed or lower resolution) than when all routed AV signals are high quality. Furthermore, by requiring fewer resources, the disclosed videoconferencing system may be able to support more meeting participants, more meeting rooms, or more sources of input AV signal using a given amount of routing signal generator module 730, AV routing module 836, and info routing module 837 resources.

In addition, videoconferencing system 800 is able to provide processed AV signals to some meeting participants using fewer AV producers and/or consumers (or using fewer resources in AV producers and/or consumers) by videoconferencing system 800 and/or the meeting participants (not shown in FIG. 8). For example, a meeting participant assigned to Room 1 in FIG. 1 may require an AV consumer with fewer resources to enable receiving lower quality (i.e., compressed or lower resolution) Room 2 processed AV signals compared to receiving non-processed, higher quality Room 2 AV signals. Furthermore, by requiring fewer producers and/or consumers (or by enabling producers and/or consumers to use fewer resources), the disclosed videoconferencing system may be able to support more meeting participants, more meeting rooms, or more sources of input AV signals while using a given amount of AV producer and/or consumer resources.

Figure 9:
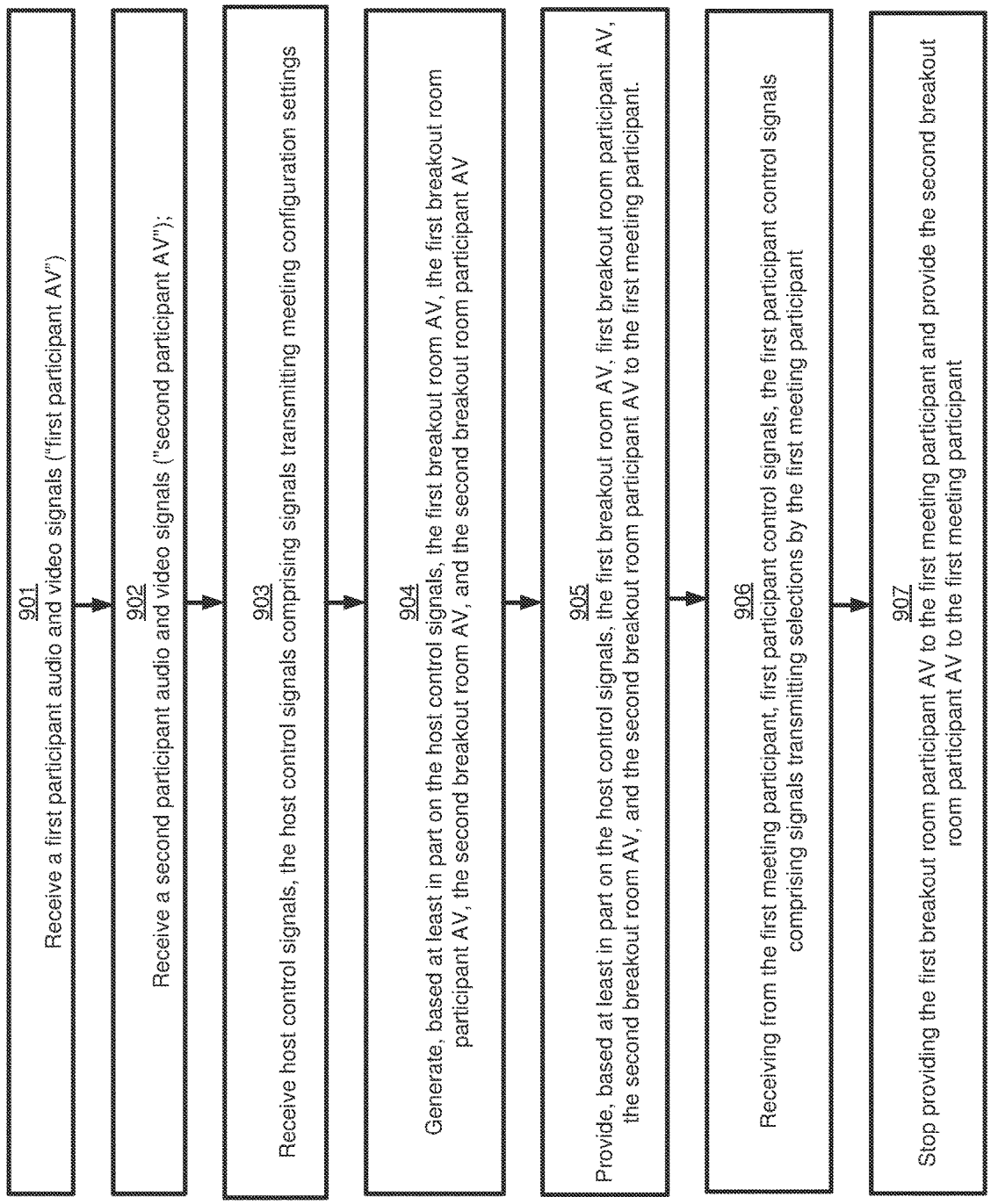
FIG. 9 is an example of a flow chart illustrating a method for interative videoconferencing, in accordance with an embodiment of the invention.

FIG. 9 is a flow chart illustrating a method for configuring, processing, and providing meeting participant audio, video, and/or information by a videoconferencing system, according to an embodiment of the invention described above with reference to FIGS. 1-7. In some implementations, the steps are performed in an order other than the order presented in FIG. 9. In other implementations, more, fewer, or alternative steps may be performed.

At step 901, videoconferencing system 120 receives audio and/or video signals from a first meeting participant ("first participant AV")".

At step 902, videoconferencing system 120 receives audio and/or video signals from a second meeting participant ("second participant AV").

At step 903, videoconferencing system 120 receives host control signals, the host control signals comprising signals transmitting meeting configuration settings. In an example, the meeting configuration settings comprising settings for:

assigning the first meeting participant to a first breakout room;

assigning the second meeting participant to a second breakout room;

configuring audio and video signals corresponding to the first breakout room ("first breakout room AV"), the first breakout room AV comprising the first participant AV, to be provided to meeting participants assigned to the first breakout room;

configuring audio and video signals corresponding to each meeting participant assigned to the first breakout room ("first breakout room participant AV") to be provided to meeting participants assigned to the first breakout room;

configuring audio and video signals corresponding to the second breakout room ("second breakout room AV"), the second breakout room AV comprising the second participant AV, to be provided to meeting participants assigned to the first breakout room; and configuring audio and video signals corresponding to each meeting participant assigned to the second breakout room ("second breakout room participant AV") to not be provided to meeting participants assigned to the first breakout room.

At step 904, videoconferencing system 120 generates, based at least in part on the host control signals, the first breakout room AV, the first breakout room participant AV, the second breakout room AV, and the second breakout room participant AV.

At step 905, videoconferencing system 120 provides, based at least in part on the host control signals, the first breakout room AV, first breakout room participant AV, the second breakout room AV, and the second breakout room participant AV to the first meeting participant. In this example, the first meeting participant is able to see video and hear audio corresponding to a breakout room (i.e., the first breakout room AV) that the first participant is not assigned to (i.e., the second breakout room) but is not able to see video or hear audio corresponding to each of the participants in the second breakout room (i.e.

FIG. 9 is a flow chart illustrating a method for receiving meeting participant audio/video, information, and/or control signals, and configuring, processing, generating, and providing meeting participant audio, video, and/or information by a videoconferencing system, according to embodiments of the invention described above with reference to FIGS. 1-8. In some implementations, the steps are performed in an order other than the order presented in FIG. 10. In other implementations, more, fewer, or alternative steps may be performed.

At step 901, the videoconferencing system receives audio and/or video and/or information signals from a first meeting participant ("first participant AV)".

At step 902, the videoconferencing system receives audio and/or video and/or information signals from a second meeting participant ("second participant AV").

At step 903, the videoconferencing system receives host control signals, the host control signals comprising signals transmitting meeting configuration settings. In an example, the meeting configuration settings comprising settings for:

assigning the first meeting participant to a first breakout room;

assigning the second meeting participant to a second breakout room;

configuring audio and video signals corresponding to the first breakout room ("first breakout room AV"), the first breakout room AV comprising the first participant AV, to be provided to meeting participants assigned to the first breakout room;

configuring audio and video signals corresponding to each meeting participant assigned to the first breakout room ("first breakout room participant AV") to be provided to meeting participants assigned to the first breakout room;

configuring audio and video signals corresponding to the second breakout room ("second breakout room AV"), the second breakout room AV comprising the second participant AV, to be provided to meeting participants assigned to the first breakout room; and configuring audio and video signals corresponding to each meeting participant assigned to the second breakout room ("second breakout room participant AV") to not be provided to meeting participants assigned to the first breakout room;

configuring the first breakout room AV to be provided to meeting participants assigned to the second breakout room;

configuring the first breakout room participant AV to not be provided to meeting participants assigned to the second breakout room; and configuring the second breakout room participant AV to be provided to meeting participants assigned to the second breakout room.

At step 904, the videoconferencing system generates, based at least in part on the host control signals, the first breakout room AV, the first breakout room participant AV, the second breakout room AV, and the second breakout room participant AV.

At step 905, the videoconferencing system provides, based at least in part on the host control signals, the first breakout room AV, first breakout room participant AV, and the second breakout room AV to the first meeting participant. Advantageously, in this example, the first meeting participant is able to hear video, see audio, and/or view information corresponding to a breakout room (i.e., second breakout room AV) that the first meeting participant is not assigned to but is not able to hear video, see audio, and/or view information corresponding to the participants (i.e., breakout room participant AV) of the second breakout room. The first meeting participant is able to view more video and/or hear more audio and/or view information than is provided by current videoconferencing systems. By limiting the audio and/or video that is provided corresponding to a meeting room that the first participant is not assigned to, the videoconferencing system is able to provide additional audio and/or video and/or information to meeting participants compared to current videoconferencing systems while consumer fewer resources (such as processing/storage resources and AV consumers/producers) (or by consuming a constrained abount of resources) in the computing systems the videoconferencing system and/or meeting participants.

In an alternate embodiment of the invention, at step 904, the videoconferencing system generates the second breakout room AV by processing the second breakout room AV to generate a reduced resolution second breakout room AV, and at step 905, the videoconferencing system provides the reduced resolution second breakout room AV to the first meeting participant. In this embodiment, the videoconferencing system is able to provide additional audio and/or video and/or information to meeting participants compared to current videoconferencing system while consuming fewer resources (such as processing/storage resources and AV consumers/producers) (or by consuming a constrained abount of resources) in the computing systems the videoconferencing system and/or meeting participants.

At step 906, the videoconferencing system receives first participant control signals, the first participant control signals comprising signals transmitting selections by the first meeting participant. In an example, the first participant control signals comprise a selection by the first meeting participant to leave the first breakout room and join the second breakout room.

At step 1007, the videoconferenicing system, based at least in part on the received first participant control signals, stops providing the first breakout room participant AV to the first meeting participant and provides the second breakout room participant AV to the first meeting participant. Advantageously, in this example, the first meeting participant is able to leave the first breakout room and join the second breakout room without host control signals changing the breakout room selection. The videoconferenicing system is able to provide more options to meeting participants than current videoconferencing systems.

Figure 10:
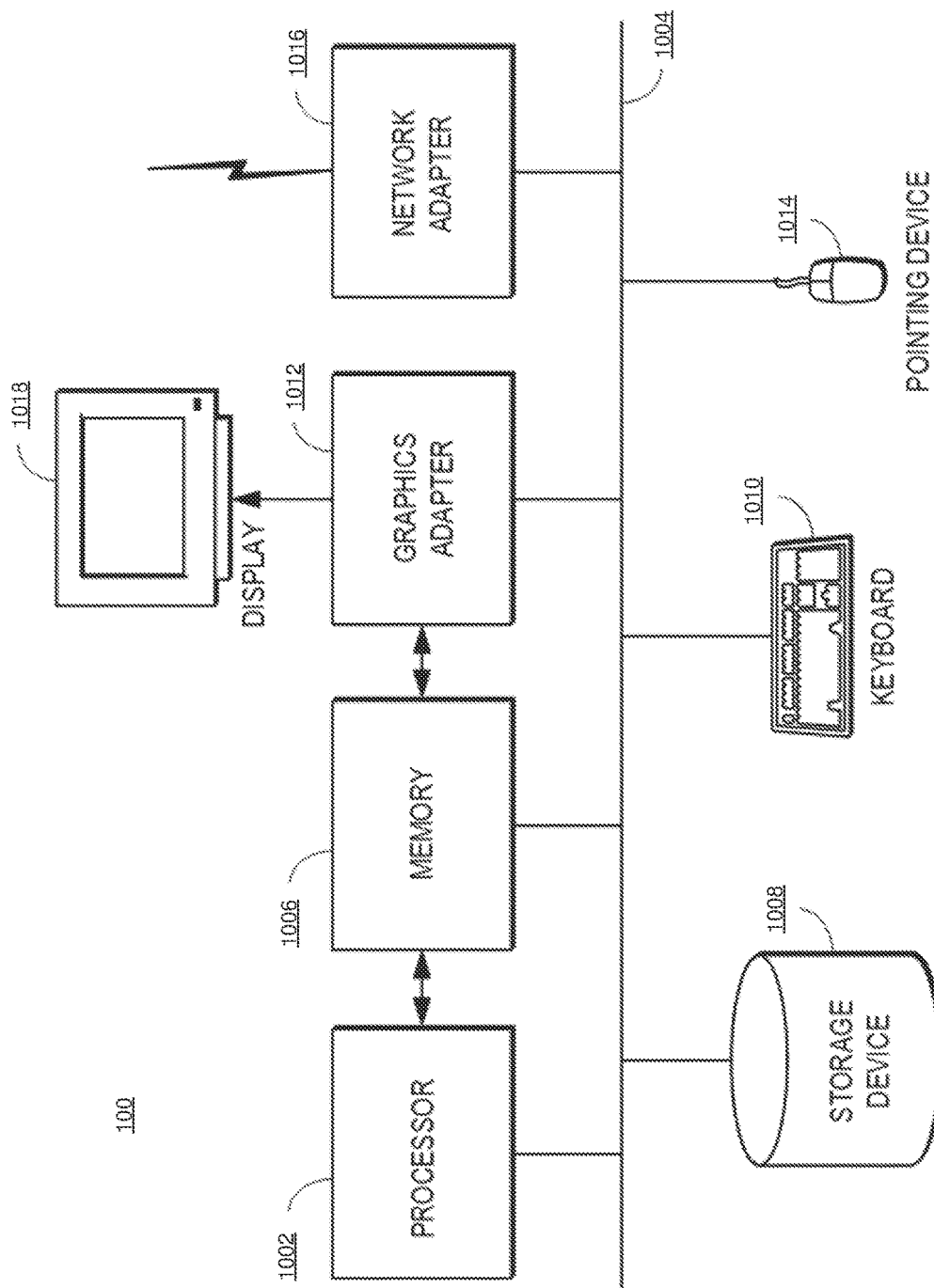
FIG. 10 is a high-level block diagram illustrating an example of a computer for use as user 130, unassigned participant 140, host 150, room participant 110a-e, videoconferencing system 120, and videoconferencing system 800.

FIG. 10 is a high-level block diagram illustrating an example of a computer for use as entity 210, publisher domain 220, consent system 270, and/or network 250 of FIG. 2, and entity 810, publisher domain 820, consent system 870, and/or network 850 of FIG. 8. Illustrated are a processor 1002 coupled to a bus 1104. Also coupled to the bus 1004 are a memory 1006, a storage device 1008, a keyboard 1010, a graphics adapter 1016, an input device 1014, and a network adapter 1116. A display 1018 is coupled to the graphics adapter 1012.

Computer 1000 comprises a processor 1002 which may be any general-purpose processor. The storage device 1008 is, in one embodiment, a hard disk drive but can also be any other device capable of storing data, such as a writeable compact disk (CD) or DVD, or a solid-state memory device. The memory 1006 may be, for example, firmware, read-only memory (ROM), non-volatile random access memory (NVRAM), and/or RAM, and holds instructions and data used by the processor 1002. The input device 1014 may be a mouse, track ball, stylus, touchscreen, or other type of input device, and is used in combination with the keyboard 1010 to input data into the computer 1000. The graphics adapter 1016 displays images and other information on the display 1018. The network adapter 1017 couples the computer 1000 to the network (not shown).

In one embodiment, the network is the Internet. The network can also utilize dedicated or private communications links that are not necessarily part of the Internet.

As is known in the art, computer 1000 is adapted to execute computer program modules. As used herein, the term "module" refers to computer program logic and/or data for providing the specified functionality. A module can be implemented in hardware, firmware, and/or software. In one embodiment, the modules are stored on the storage device 1008, loaded into the memory 1006, and executed by the processor 1002. Computer 1000 is configured to perform the specific functions and operations by various modules, for example as detailed in FIGS. 1, 2, and 8, and thereby operates as a particular computer under such program control. The types of computers 1000 utilized by the entities of FIGS. 1, 2, and 8 can vary depending upon the embodiment and the processing power utilized by the entity.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed:

1. A method, comprising:
receiving, by a videoconferencing system from a first meeting participant, a first participant audio and video signals ("first participant AV");
receiving, by the videoconferencing system from a second meeting participant, a second participant audio and video signals ("second participant AV");
receiving, by the videoconferencing system from a host of a meeting, host control signals, the host control signals comprising signals transmitting meeting configuration settings, the meeting configuration settings comprising settings for:
assigning the first meeting participant to a first breakout room;
assigning the second meeting participant to a second breakout room;
configuring audio and video signals corresponding to the first breakout room ("first breakout room AV, to be provided to meeting participants assigned to the first breakout room;
configuring audio and video signals corresponding to each meeting participant assigned to the first breakout room ("first breakout room participant AV"), the first breakout room participant AV comprising the first meeting participant AV, to be provided to meeting participants assigned to the first breakout room;
configuring audio and video signals corresponding to the second breakout room ("second breakout room AV, to be provided to meeting participants assigned to the first breakout room; and
configuring audio and video signals corresponding to each meeting participant assigned to the second breakout room ("second breakout room participant AV")— the second breakout room AV comprising the second meeting participant AV, to not be provided to meeting participants assigned to the first breakout room;

generating, by the videoconferencing system based at least in part on the received host control signals, the first breakout room AV, the first breakout room participant AV, the second breakout room AV, and the second breakout room participant AV; and providing, by the videoconferencing system based at least in part on the received host control signals, the first breakout room AV, first breakout room participant AV, and the second breakout room AV to the first meeting participant, and not providing the second breakout room participant AV to the first meeting participant.

2. The method of claim 1, wherein:

the meeting configuration settings further comprise settings for:
  configuring the first breakout room AV to be provided to meeting participants assigned to the second breakout room;
  configuring the first breakout room participant AV to not be provided to meeting participants assigned to the second breakout room; and
  configuring the second breakout room participant AV to be provided to meeting participants assigned to the second breakout room; and the method further comprises:
  receiving, by the videoconferencing system from the first meeting participant, first participant control signals, the first participant control signals comprising signals transmitting a selection by the first meeting participant to leave the first breakout room and join the second breakout room;
  stop providing, by the videoconferencing system based at least in part on the received first participant control signals, the first breakout room participant AV to the first meeting participant; and
  providing, by the videoconferencing system, the second breakout room participant AV to the first meeting participant.

3. The method of claim 1, further comprising:

generating the second breakout room AV further comprises processing, by the videoconferencing system based at least in part on the received host control signals, the second breakout room AV to generate a reduced resolution second breakout room AV; and providing, by the videoconferencing system, the second breakout room AV to the first meeting participant comprises providing the reduced resolution second breakout room AV to the first meeting participant.

4. The method of claim 1, wherein the first participant AV comprises one of audio signals from a microphone and audio signals from a computing device.

5. The method of claim 1, wherein the first participant AV comprises one of video signals from a camera and video signals from a computing device.

6. The method of claim 1, wherein:

the meeting configuration settings further comprise settings for designating the first meeting participant assigned to the first breakout room as a designated presenter; and configuring the first breakout room AV further comprises configuring the first breakout room AV consisting only of the first participant AV.

7. A non-transitory computer-readable storage medium storing processor-executable computer program instructions that, when executed, cause a computer processor to perform a method, the method comprising:

receiving, by a videoconferencing system from a first meeting participant, a first participant audio and video signals ("first participant AV");

receiving, by the videoconferencing system from a second meeting participant, a second participant audio and video signals ("second participant AV");

receiving, by the videoconferencing system from a host of a meeting, host control signals, the host control signals comprising signals transmitting meeting configuration settings, the meeting configuration settings comprising settings for:
  assigning the first meeting participant to a first breakout room;
  assigning the second meeting participant to a second breakout room;
  configuring audio and video signals corresponding to the first breakout room ("first breakout room AV") to be provided to meeting participants assigned to the first breakout room;
  configuring audio and video signals corresponding to each meeting participant assigned to the first breakout room ("first breakout room participant AV"), the first breakout room participant AV comprising the first meeting participant AV, to be provided to meeting participants assigned to the first breakout room;
  configuring audio and video signals corresponding to the second breakout room ("second breakout room AV") to be provided to meeting participants assigned to the first breakout room; and
  configuring audio and video signals corresponding to each meeting participant assigned to the second breakout room ("second breakout room participant AV"), the second breakout room AV comprising the second meeting participant AV, to not be provided to meeting participants assigned to the first breakout room; and generating, by the videoconferencing system based at least in part on the received host control signals, the first breakout room AV, the first breakout room participant AV, the second breakout room AV, and the second breakout room participant AV; and providing, by the videoconferencing system based at least in part on the received host control signals, the first breakout room AV, first breakout room participant AV, and the second breakout room AV to the first meeting participant, and not providing the second breakout room participant AV to the first meeting participant.

8. The medium of claim 7, wherein:

the meeting configuration settings further comprise settings for:
  configuring the first breakout room AV to be provided to meeting participants assigned to the second breakout room;
  configuring the first breakout room participant AV to not be provided to meeting participants assigned to the second breakout room; and
  configuring the second breakout room participant AV to be provided to meeting participants assigned to the second breakout room; and the method further comprises:
  receiving, by the videoconferencing system from the first meeting participant, first participant control signals, the first participant control signals comprising signals transmitting a selection by the first meeting participant to leave the first breakout room and join the second breakout room;

stop providing, by the videoconferencing system based at least in part on the received first participant control signals, the first breakout room participant AV to the first meeting participant; and providing, by the videoconferencing system, the second breakout room participant AV to the first meeting participant.

9. The medium of claim 7, wherein the method further comprises:

generating the second breakout room AV further comprises processing, by the videoconferencing system based at least in part on the received host control signals, the second breakout room AV to generate a reduced resolution second breakout room AV; and providing, by the videoconferencing system, the second breakout room AV to the first meeting participant comprises providing the reduced resolution second breakout room AV to the first meeting participant.

10. The medium of claim 7, wherein the first participant AV comprises one of audio signals from a microphone and audio signals from a computing device.

11. The medium of claim 7, wherein the first participant AV comprises one of video signals from a camera and video signals from a computing device.

12. The medium of claim 7, wherein:

the meeting configuration settings further comprise settings for designating the first meeting participant assigned to the first breakout room as a designated presenter; and configuring the first breakout room AV further comprises configuring the first breakout room AV consisting only of the first participant AV.

13. A system comprising:

a processor; and a non-transitory computer-readable storage medium storing processor-executable computer program instructions that, when executed, cause a computer processor to perform a method, the method comprising:

receiving, by a videoconferencing system from a first meeting participant, a first participant audio and video signals ("first participant AV");

receiving, by the videoconferencing system from a second meeting participant, a second participant audio and video signals ("second participant AV");

receiving, by the videoconferencing system from a host of a meeting, host control signals, the host control signals comprising signals transmitting meeting configuration settings, the meeting configuration settings comprising settings for:

assigning the first meeting participant to a first breakout room;

assigning the second meeting participant to a second breakout room;

configuring audio and video signals corresponding to the first breakout room ("first breakout room AV") to be provided to meeting participants assigned to the first breakout room;

configuring audio and video signals corresponding to each meeting participant assigned to the first breakout room ("first breakout room participant AV"), the first breakout room participant AV comprising the first meeting participant AV, to be provided to meeting participants assigned to the first breakout room;

configuring audio and video signals corresponding to the second breakout room ("second breakout room AV") to be provided to meeting participants assigned to the first breakout room; and configuring audio and video signals corresponding to each meeting participant assigned to the second breakout room ("second breakout room participant AV"), the second breakout room AV comprising the second meeting participant AV, to not be provided to meeting participants assigned to the first breakout room;

generating, by the videoconferencing system based at least in part on the received host control signals, the first breakout room AV, the first breakout room participant AV, the second breakout room AV, and the second breakout room participant AV; and providing, by the videoconferencing system based at least in part on the received host control signals, the first breakout room AV, first breakout room participant AV, and the second breakout room AV to the first meeting participant, and not providing the second breakout room participant AV to the first meeting participant.

14. The system of claim 13, wherein:

the meeting configuration settings further comprise settings for:

configuring the first breakout room AV to be provided to meeting participants assigned to the second breakout room;

configuring the first breakout room participant AV to not be provided to meeting participants assigned to the second breakout room; and configuring the second breakout room participant AV to be provided to meeting participants assigned to the second breakout room; and the method further comprises:

receiving, by the videoconferencing system from the first meeting participant, first participant control signals, the first participant control signals comprising signals transmitting a selection by the first meeting participant to leave the first breakout room and join the second breakout room;

stop providing, by the videoconferencing system based at least in part on the received first participant control signals, the first breakout room participant AV to the first meeting participant; and providing, by the videoconferencing system, the second breakout room participant AV to the first meeting participant.

15. The system of claim 13, wherein the method further comprises:

generating the second breakout room AV further comprises processing, by the videoconferencing system based at least in part on the received host control signals, the second breakout room AV to generate a reduced resolution second breakout room AV; and providing, by the videoconferencing system, the second breakout room AV to the first meeting participant comprises providing the reduced resolution second breakout room AV to the first meeting participant.

16. The system of claim 13, wherein the first participant AV comprises one of audio signals from a microphone and audio signals from a computing device.

17. The system of claim 13, wherein the first participant AV comprises one of video signals from a camera and video signals from a computing device.

18. The system of claim 13, wherein:
the meeting configuration settings further comprise settings for designating the first meeting participant assigned to the first breakout room as a designated presenter; and
configuring the first breakout room AV further comprises configuring the first breakout room AV consisting only of the first participant AV.

* * * * *